(12) United States Patent
Fritzson

(10) Patent No.: US 11,370,447 B2
(45) Date of Patent: Jun. 28, 2022

(54) METHOD AND SYSTEM FOR CALIBRATION OF SENSOR SIGNALS IN A VEHICLE

(71) Applicant: Zuragon Sweden AB, Danderyd (SE)

(72) Inventor: Joachim Fritzson, Javea (ES)

(73) Assignee: Zuragon Sweden AB

( * ) Notice: Subject to any disclaimer, the term of this patent is extended or adjusted under 35 U.S.C. 154(b) by 373 days.

(21) Appl. No.: 16/654,316

(22) Filed: Oct. 16, 2019

(65) Prior Publication Data

US 2020/0122740 A1 Apr. 23, 2020

(30) Foreign Application Priority Data

Oct. 17, 2018 (SE) .................................. 1851273-1

(51) Int. Cl.
*B60W 50/00* (2006.01)
*G01S 7/497* (2006.01)
(Continued)

(52) U.S. Cl.
CPC ........ *B60W 50/0098* (2013.01); *B60W 10/18* (2013.01); *B60W 10/20* (2013.01);
(Continued)

(58) Field of Classification Search
CPC .. B60W 50/0098; B60W 10/18; B60W 10/20; B60W 2050/0083; B60W 2420/42; B60W 2420/52; G01S 7/497; G01S 17/86; G01S 7/40; G01S 13/865; G01S 13/931; G01S 17/931; G01S 17/93; G01S 13/86; G01S 13/867; G01S 13/88; G01S 13/93; G01S 17/00; G06T 7/80; G05D 1/10
See application file for complete search history.

(56) References Cited

U.S. PATENT DOCUMENTS

| | | | |
|---|---|---|---|
| 7,761,251 B2 * | 7/2010 | Bauerle ................ | G01D 18/004 702/89 |
| 8,504,864 B2 * | 8/2013 | Menon .................. | H04L 12/403 713/401 |

(Continued)

OTHER PUBLICATIONS

Swedish Search Report dated Apr. 26, 2019 issued in Swedish Application No. 1851273-2 consisting of 8 pages.
(Continued)

*Primary Examiner* — Thomas Ingram
(74) *Attorney, Agent, or Firm* — Christopher & Weisberg, P.A.

(57) ABSTRACT

A method for calibrating sensor signals in networks in a vehicle, wherein a number of sensors are arranged in the vehicle including one or more cameras, one or more LIDAR, and one or more radar units each communicating with a electronic control unit over a network, the electronic control unit communicating with vehicle elements including braking system and steerings system. The method includes receiving incoming signals from sensors at a calibration unit, wherein the incoming signals contain information of a detected object or signal, determining a delay for each received signal relative to a predetermined master clock time; and determining one calibration time for all the received signals based on the determined delays relative the predetermined master clock time.

13 Claims, 7 Drawing Sheets

(51) Int. Cl.
*G06T 7/80* (2017.01)
*B60W 10/20* (2006.01)
*B60W 10/18* (2012.01)
*G01S 17/86* (2020.01)

(52) U.S. Cl.
CPC ............. *G01S 7/497* (2013.01); *G01S 17/86* (2020.01); *G06T 7/80* (2017.01); *B60W 2050/0083* (2013.01); *B60W 2420/42* (2013.01); *B60W 2420/52* (2013.01)

(56) References Cited

U.S. PATENT DOCUMENTS

| | | |
|---|---|---|
| 8,885,152 B1 | 11/2014 | Wright |
| 2005/0134440 A1* | 6/2005 | Breed .................... G01S 17/931 340/435 |
| 2008/0031283 A1* | 2/2008 | Curran-Gray ......... H04J 3/0667 370/503 |
| 2014/0240688 A1* | 8/2014 | Fritsch .................... G01D 18/00 356/3 |
| 2017/0124781 A1* | 5/2017 | Douillard .............. G01S 17/931 |
| 2018/0106903 A1* | 4/2018 | Iida ....................... G01S 7/4817 |

OTHER PUBLICATIONS

Diarra et al., "Improved Clock Synchoronization Start-Up Time for Ethernet AVB-Based In-Vehicle Networks"; In Proc. of 20th Conference on Emerging Technologies & Factory Automation (EFTA), consisting of 8 pages.

* cited by examiner

METHOD AND SYSTEM FOR CALIBRATION OF SENSOR SIGNALS IN A VEHICLE

CROSS-REFERENCE TO RELATED APPLICATION

This application is related to and claims priority to Swedish Application No. 1851273-1, filed Oct. 17, 2018, the entire contents of which is incorporated herein by reference.

TECHNICAL FIELD

The present invention generally relates to the field of autonomous vehicles and vehicle control systems.

BACKGROUND

Vehicles, such as driverless cars, can include systems, such as sensors, cameras, etc. that generate enormous amounts of data that are sent to the vehicle control system. Driverless cars can operate autonomously in many situations. Sensor's, cameras, and other units of the car thus provide input to the vehicle's control system and the control system operate the vehicle autonomously based on the provided input. One example of a vehicle control system that is becoming increasingly popular is Advanced Driver Assistance System systems, "ADAS" systems. ADAS systems provide one or more autonomous features to the vehicles which include these ADAS systems. For example, an ADAS system may monitor the position of the vehicle relative to the lane in which the vehicle is travelling and if the vehicle begins to swerve outside that lane the ADAS system may take remedial action by repositioning the vehicle so that the vehicle stays in the lane or providing a notification to the driver informing the driver of the situation.

Hence, the vehicles today, in particular driverless cars, includes sensors or detection units such as one or more cameras, one or more LIDARs, one or more radar sensors, etc. which simultaneously provides input to the ADAS system over a network. The ADAS system continuously makes decisions regarding situations, e.g. degree of seriousness, and sends control signals based on the decisions to different units of the vehicle. For example, the ADAS system may send control signals to the braking system of the vehicle and/or steering system of the vehicle to avoid a collision or to navigate the vehicle in a traffic situation.

However, a problem that occur in these complex vehicle systems is related to sensor delays because each sensor or detection unit has different delays. For example, a camera sensor may only generate X images per second (frame rate), a LIDAR sensor can rotate Y revolutions per second and a radar sensor can do Z scans per second. This will inevitably lead to delays and time misalignments between registrations of a certain event for the different sensors. Depending on the combination of sensors these delays may be up to several hundred of microseconds. This in turn leads to problems and difficulties when synchronizing and reconstructing events for training purposes and it may also result in time delays in or erroneous instructions to vehicle units.

These problems are becoming increasingly more pronounced due to the increased number of sensors in a vehicle. For example, a vehicle will very likely have up to 10-15 cameras in the near future.

Hence, there is a need within the business of systems and methods that can handle the above-mentioned problems.

SUMMARY

According to an object of the present invention, there is provided methods and systems for calibrating and synchronizing sensor signals in a vehicle.

According to an aspect of the present invention, a method for calibrating sensor signals in networks in a vehicle is provided. A number of sensors are arranged in the vehicle including one or more cameras, one or more LIDAR, and one or more radar units each communicating with an electronic control unit over a network. The electronic control unit communicates with vehicle elements including braking system and steerings system. The method includes sending at least one light indication, for example by turning on or off a light emitter, to a sensor from a calibration signal emitting unit; and sending a synchronization signal to a calibration unit from the calibration signal emitting unit simultaneously or at a given delay, for example, between 1-5 microseconds. Thereafter, the delay between receiving a data signal from the sensor receiving the light indication and receiving the synchronization signal is determined at the calibration unit. A calibration factor is determined for the sensor based on the determined delay. The above steps are repeated for each of one or more cameras, one or more LIDAR, and one or more radar units.

According to a further aspect of the present invention, there is provided a calibration unit communicating with sensors including one or more cameras, one or more LIDAR, and one or more radar units over a network. The calibration unit further communicates with an electronical control unit. The detected data from the sensors is fed to the calibration unit. A calibration signal emitting unit is arranged to emit signals, e.g. visible light signals or IR light signals, and to send and receive network signals and communicates with the calibration unit. Upon receiving a start signal from the calibration unit over the network, the calibration signal emitting unit synchronously or with a given delay, e.g. a few microseconds, sends a light indication, by turning on or off the light, towards a sensor and a synchronization signal. The time difference or delay between receiving a data signal from the sensor receiving the light indication and the synchronization signal from the calibration signal emitting unit is determined at the calibration unit and a calibration value for the sensor is determined. This can be repeated for each of one or more cameras, one or more LIDAR, and one or more radar units.

In embodiments of the present invention, there is provided a method for calibrating sensor signals in networks in a vehicle, wherein a number of sensors are arranged in the vehicle including one or more cameras, one or more LIDAR, and one or more radar units each communicating with a electronic control unit over a network, the electronic control unit communicating with vehicle elements including braking system and steerings system. The method comprises receiving incoming signals from sensors at a calibration unit, wherein the incoming signals contain information of a detected object or signal, determining a delay for each received signal relative to a predetermined master clock time; and determining one calibration time for all the received signals based on the determined delays relative the predetermined master clock time.

In embodiments of the present invention, the method includes selecting the system clock time of the electronic control unit or network as master clock time, or selecting a sensor clock time as master clock time.

According to embodiments of the present invention, a sensor is selected as master origo in a graphical representation of sensor positions, wherein the graphical representation is determined based on received incoming signals from the sensor. Coordinates for each other sensor in the graphical representation relative the master origo is determined and each other sensor coordinates are offset in graphical representation to obtain a minimum deviation between said master origo and respective sensor coordinates wherein calibrated sensor positions and/or time can be provided.

In embodiments of the present invention, the method includes determining one calibration time for all the received signals is based on a weighted average of the different delays, or a median value of the different delays, or a selected time corresponding to the master clock time and a delay being lower than the maximum delay and higher than the minimum delay.

In embodiments of the present invention, the method includes sending at least one calibration signal, e.g. a visible light signal or IR signal, to at least one sensor from a calibration signal emitting unit at a predetermined distance from the sensor, sending a first network signal to a calibration unit from the calibration signal emitting unit simultaneously or at a predetermined delay, receiving a second network signal from the at least one sensor that the light signal has been detected, determining the difference between the first and respective second network signals in the calibration unit; and determining a calibration time for the respective sensor based on the determined difference. The predetermined distance can be varied.

In an aspect of the present invention, there is provided a system for calibrating sensor signals in networks in a vehicle, wherein a number of sensors are arranged in the vehicle including one or more cameras, one or more LIDAR, and one or more radar units each communicating with a electronic control unit over a network, the electronic control unit communicating with vehicle elements including braking system and steerings system. The system comprises a calibration unit configured to receive incoming signals from sensors, wherein the incoming signals contain information of a detected object or signal, wherein the calibration unit is configured to determine a delay for each received signal relative to a predetermined master clock time and determine one calibration time for all the received signals based on the determined delays relative the predetermined master clock time.

As the skilled person realizes, steps of the methods according to the present invention, as well as preferred embodiments thereof, are suitable to realize as computer program or as a computer readable medium.

Further objects and advantages of the present invention will be discussed below by means of exemplifying embodiments.

BRIEF DESCRIPTION OF THE DRAWINGS

Exemplifying embodiments of the invention will be described below with reference to the accompanying drawings, in which.

DETAILED DESCRIPTION

The following is a description of exemplifying embodiments in accordance with the present invention. This description is not to be taken in limiting sense, but is made merely for the purposes of describing the general principles of the invention.

Thus, preferred embodiments of the present invention will now be described for the purpose of exemplification with reference to the accompanying drawings, wherein like numerals indicate the same elements throughout the views. It should be understood that the present invention encompasses other exemplary embodiments that comprise combinations of features as described in the following. Additionally, other exemplary embodiments of the present invention are defined in the appended claims.

First, the ADAS system will be described in general terms. An ADAS system may include one or more of the following elements of a vehicle: an adaptive cruise control ("ACC"); an adaptive high beam system; an adaptive light control system; an automatic parking system; an automotive night vision system; a blind spot monitor; a collision avoidance system (sometimes called a pre-collision system or a "PCS"); a crosswind stabilization system; a driver drowsiness detection system; a driver monitoring system; an emergency driver assistance system; a forward collision warning system; an intersection assistance system; an intelligent speed adaptation system; a lane departure warning system (sometimes called a lane keep assist system or "LKA"); a pedestrian protection system; a traffic sign recognition system; a turning assistant; and a wrong-way driving warning system. The ADAS system may also include any software or hardware included in the vehicle that makes the vehicle be an autonomous vehicle or semi-autonomous vehicle.

Figure 1:
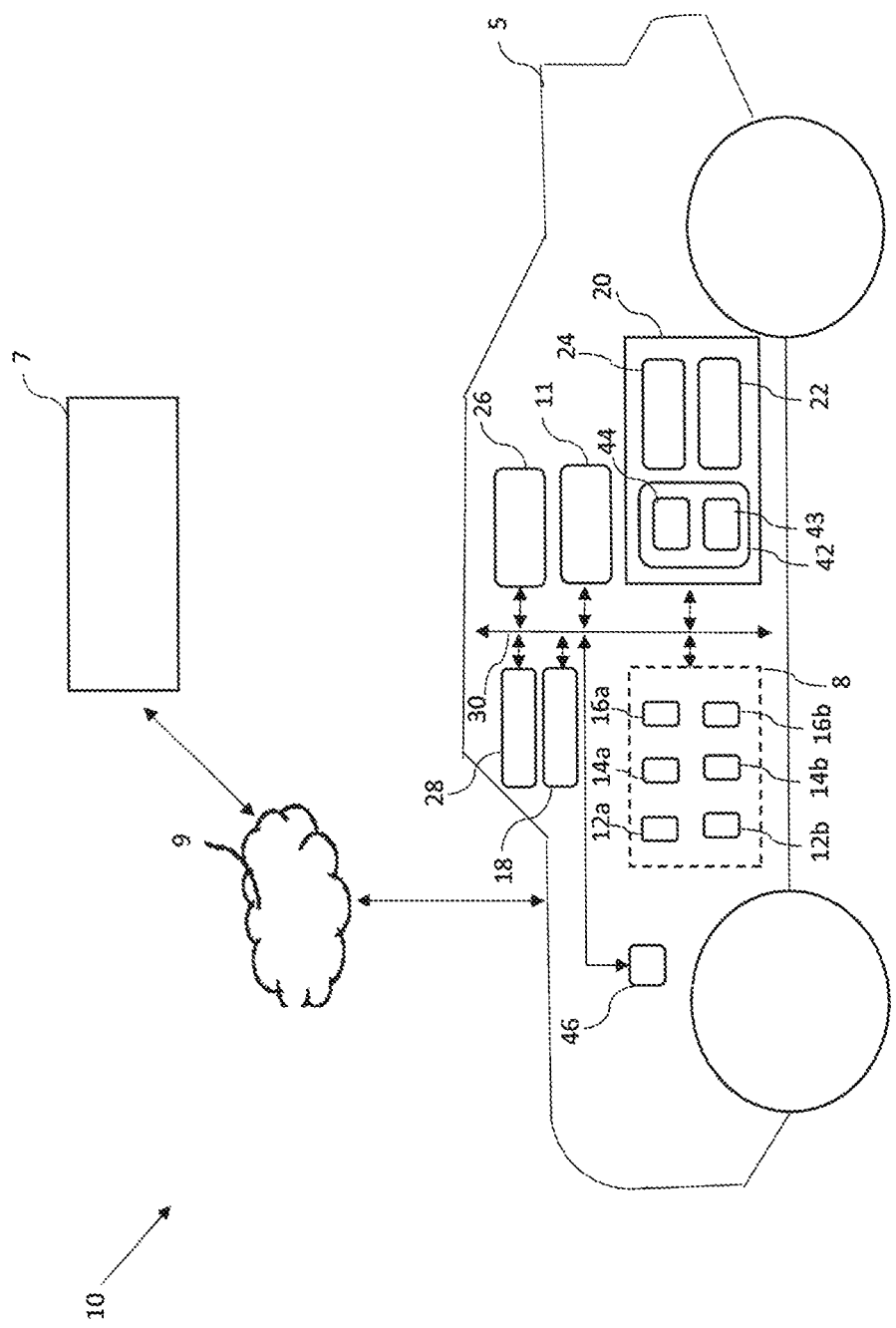
FIG. 1 is a schematic block diagram illustrating a vehicle including the system and elements according to an embodiment of the present invention.

Referring now to FIG. 1, an operating environment 10 for the present invention. The operating environment 10 is implemented in a vehicle 5 and a server 7 located externally of the vehicle 5. These elements may be communicatively connected or coupled to a network 9. Although only one vehicle 5 and one server and one network 9 are shown in FIG. 1, in practice the operating environment may include more vehicles, server and networks. The network 9 may be a conventional type, wired or wireless, and may have numerous different configurations including a star configuration, token ring configuration or other configurations. Furthermore, the network 9 may also include a local area network (LAN), a wide area network (WAN) (e.g. the Internet), or other interconnected data paths across which multiple device and entities may communicate. The network 9 may also be coupled to or may include portions of telecommunications networks for sending data in a variety of different protocols. For example, the network 9 may include Bluetooth® communication networks or cellular communications networks for sending or receiving data including data including via short messaging service (SMS), multimedia messaging service (MMS), hypertext transfer protocol (HTTP), direct data connection, wireless application protocol (WAP), e-mail, DSRC, full-duplex wireless communication, etc. Further, the network may also include a mobile data network that may include 3G, 4G, LTE, VoLTE or any other cellular network, mobile data network or combination of mobile data networks. The network 9 may also include one or more IEEE 802.11 wireless networks.

The vehicle 5 may include a car, a truck, a sports utility vehicle (SUV), a bus, a semi-truck, a drone, or any other roadway-based conveyance. A road-based conveyance is hardware device that traverses the top surface of a roadway.

In embodiments, the vehicle 5 may include an autonomous vehicle, a semi-autonomous vehicle or Highly Automated Vehicle ("HAV"). For example, the vehicle 5 may include an ADAS system 11 which is operable to make the vehicle 5 an autonomous vehicle. An HAV is a vehicle 5 whose ADAS system 11 operate at level 3 or higher as defined by the NHTSA in the policy paper "Federal Automated Vehicles Policy: Accelerating the Next Revolution in Road-way safety", published in September 2016.

The vehicle 5 may further include a sensor set 8 comprising camera sensors 12a and 12b, one or more LIDAR sensors 14a and 14b, and one or more radar sensors 16a and 16b. In the present example, two camera sensors, two LIDAR sensors, and two radar sensors are shown. However, any number of sensors may be included and a vehicle may often have 10-15 camera sensors as an example. It should also be understood that the location of the sensors in the figures only are schematical, i.e. for illustrative purposes only, and may be located at any suitable location in the vehicle 5 in order to satisfy its functions and purposes.

Furthermore, the vehicle 5 may include an actuator set 18, a hardware ECU 20, a communication unit 26, and GPS unit 28. The ECU 20 in turn include a processor 22, and a memory 24. These elements of the vehicle 5 is communicatively coupled to one another via a bus 30. The memory 24 may be a non-transitory computer readable memory. The memory 24 stores instructions or data that can be executed by the processor 22. The instructions or data contain code for performing the techniques described herein. In some embodiments the memory 24 may be a dynamic random access memory (DRAM) device, a static random access memory (SRAM) device, flash memory, or some other memory device. In some embodiments, the memory 24 also includes a non-volatile memory or similar permanent storage device and media including a hard disk drive, a floppy disk drive, a CD-ROM device, a DVD-ROM device, a DVD-RAM device, a DVD-RW device, a flash memory device or some other mass storage device for storing information on a more permanent basis.

Figure 2:
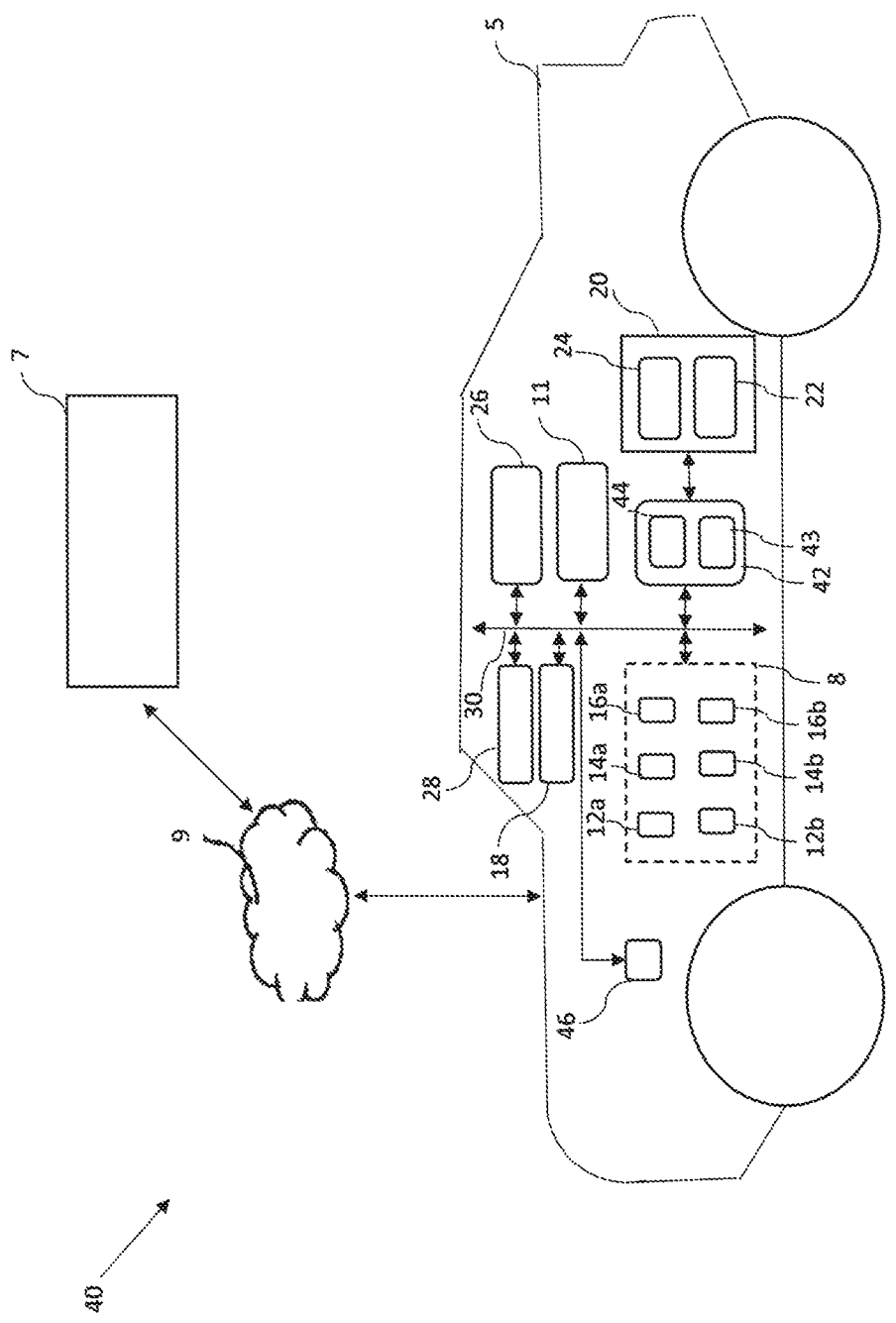
FIG. 2 is a schematic block diagram illustrating a vehicle including the system and elements according to another embodiment of the present invention.

The processor 22 may include an arithmetic logic unit, a microprocessor, a general purpose controller or some other processor array to perform computations and provide electronic display signals to a display device. The processor 22 processes data signals and may include various computing architectures including a complex instruction set computer ("CISC") architecture, a reduced instruction set computer ("RISC") architecture or an architecture implementing a combination of instructions sets. Although FIGS. 1 and 2 shown single processors in the ECU and calibration unit multiple processors may be included.

The sensor set 8 includes camera sensors 12a, 12b, LIDAR sensors 14a, 14b and radar sensors 16a, 16b. However, it may further include millimeter wave radar, a speed sensor, a laser altimeter, a navigation sensor (e.g. a global positioning system sensor of the GPS unit), an infrared detector, a motion detector, a thermostat, a sound detector, a carbon monoxide detector, an oxygen sensor, a mass air flow sensor, an engine coolant temperature sensor, a throttle position sensor, a crank shaft position sensor, an automobile engine sensor, a valve timer, an air-fuel ratio meter, a blind spot meter, a curb feeler, a defect meter, a Hall effect sensor, a manifold absolute pressure sensor, a parking sensor, a radar gun, a speedometer, a transmission fluid temperature sensor, a turbine speed sensor, a variable reluctance sensor, a wheel speed sensor, and any type of automotive sensor that may be present in an HAV.

The sensor set 8 may be operable to record data (hereinafter "sensor data") that described one or more measurements of the sensors included in the sensor set 8.

As indicated above, the sensor set 8 include sensors that are operable to measure the physical environment outside the vehicle 5. For example, the sensor set 8 may record one or more physical characteristics of the physical environment that is proximate to the vehicle 5. The measurements recorded by the sensors are described by sensor data stored in the memory 24.

The sensor data may describe the physical environment proximate to the vehicle at one or more times. The sensor data may be timestamped by the sensors of the sensor set 8.

The sensor set 8 includes as, described above, sensors 12a, 12b, 14a, 14b, 16a, and 16b that are operational to measure, among other things: the physical environment, or roadway environment where the vehicle 5 is located as well as the static objects within this physical environment, the dynamic objects within the physical environment and the behaviour of these objects, the position of the vehicle 5 relative to static and dynamic objects within the physical environment (e.g. as recorded by one or more of range-finding sensors such as LIDAR) and the weather within the physical environment over time and other natural phenomena within the physical environment over time, coefficients of friction and other variables describing objects.

A calibration unit 42 for calibrating the sensor signals or sensor data may be included in the ECU 20, as shown in FIG. 1, or coupled to the sensor set 8 as shown in FIG. 2 illustrating an environment 40. The calibration unit 42 may comprise a processor 43 and a memory 44. In some embodiments, the calibration unit 42 may use the memory 24 of the ECU 20 and/or processor 22 of the ECU 20.

Further, a calibration signal emitting unit 46, for example, including a LED, arranged to simultaneously send a data signal to the calibration unit 42 via the bus 30 and emit a light signal towards a sensor 12a, 12b, 14a, 14b, 16a, 16b, or send the signals at a defined delay (for example between 1-5 microseconds) may be arranged in the vehicle 5. In embodiments of the present invention, one calibration signal emitting unit 46 may be arranged at each sensor 12a, 12b, 14a, 14b, 16a, 16b.

The memory 44 may be a non-transitory computer readable memory. The memory 44 stores instructions or data that can be executed by the processor 43. The instructions or data contain code for performing the techniques described herein. The memory stores any information or data necessary for executing the functionality of the calibration unit 42. The memory 43 may store input sensor data and/or calibrated sensors data In some embodiments the memory 44 may be a dynamic random access memory (DRAM) device, a static random access memory/SRAM) device, flash memory, or some other memory device. In some embodiments, the memory 44 also includes a non-volatile memory or similar permanent storage device and media including a hard disk drive, a floppy disk drive, a CD-ROM device, a DVD-ROM device, a DVD-RAM device, a DVD-RW device, a flash memory device or some other mass storage device for storing information on a more permanent basis.

The processor 42 may include an arithmetic logic unit, a microprocessor, a general purpose controller or some other processor array to perform computations and provide electronic display signals to a display device. The processor 42 processes data signals and may include various computing architectures including a complex instruction set computer ("CISC") architecture, a reduced instruction set computer ("RISC") architecture or an architecture implementing a combination of instructions sets. Although FIGS. 1 and 2 shown single processors in the ECU and calibration unit multiple processors may be included.

The communication unit 26 transmits and receives data to and from the network 9 or to another communication channel. In some embodiments, the communication unit 26 may include a DSRC transceiver, DSRC receiver and to the hardware or software necessary to make the vehicle 5 a DSRC-enabled device.

In embodiments of the present invention, the communication unit 26 includes a port for direct physical connection to the network 9 or to another communication channel. For example, the communication unit 26 includes a USB, SD, CAT-5, or similar port for wired communication with the network 9. In some embodiments, the communication unit 26 includes a wireless transceiver for exchanging data with the network 9 or other communication channel using one or more wireless communication methods, including IEEE 802.11; IEEE 802.16, BLUETOOTH®, EN ISO 14906: 2004 Electronic Fee Collection Application interface EN 11253:2004 Dedicated Short-Range Communication—Physical Layer using microwave at 5.8 GHz (review); EN 12795:2002 Dedicated Short-Range Communication (DSRC)—DSRC data link layer: Medium Access and logical link control (review); EN 12834:2002 Dedicated Short-Range Communciation—Application layer (review); EN 13372:2004 Dedicated Short-Range Communication (DSRC)—DSRC profiles for RTTT applications (review). In some embodiments, the communication unit 26 includes a cellular communication transceiver for sending and receiving data over a cellular communications network including via short messaging service (SMS), multimedia messaging service (MMS), hypertext transfer protocol ("HTTP" or "HTTPS" if the secured implementation of HTTP is used), direct data connection, WAP, email or any other suitable type of electronic communication. In some embodiments, the communication unit 26 also provides other conventional connections to the network 9 for distribution of files or media using standard network protocols including TCP/IP, HTTP, HTTPS and SMTP, millimeter wave, DSRC, etc.

Figure 3:
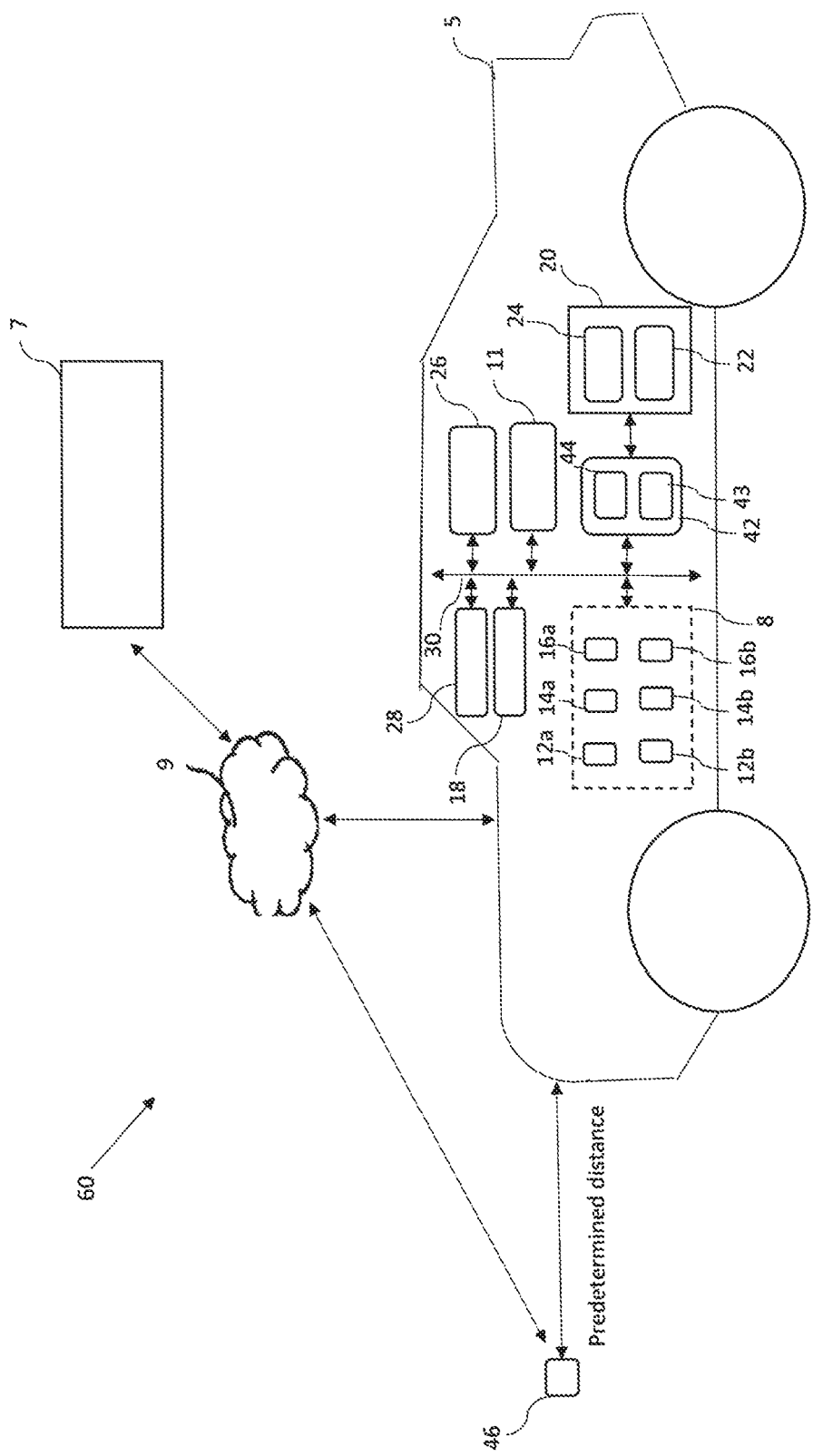
FIG. 3 is a schematic block diagram illustrating a vehicle including the system and elements according to a further embodiment of the present invention.
Figure 4:
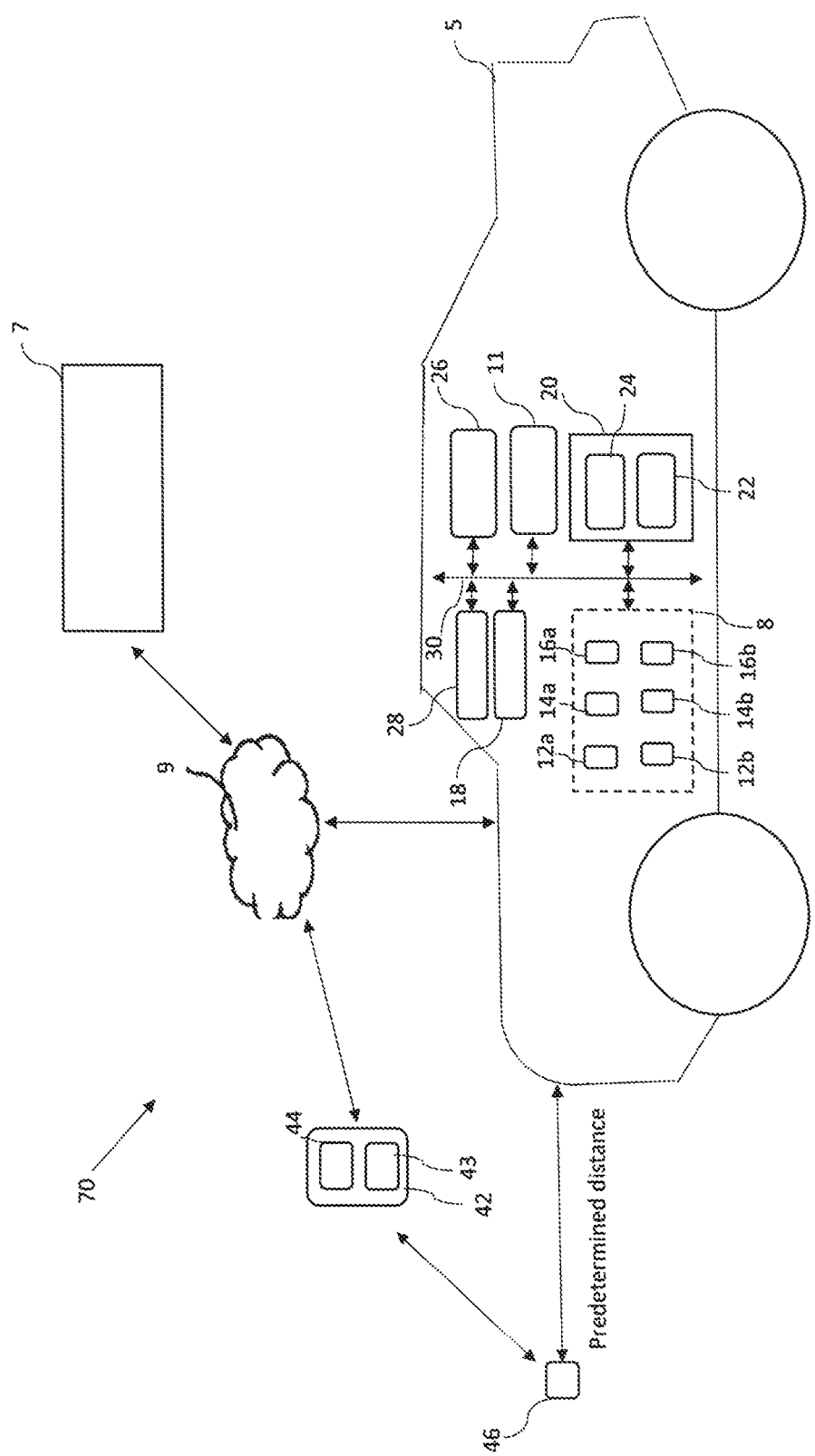
FIG. 4 is a schematic block diagram illustrating a vehicle including the system and elements according to a further embodiment of the present invention.

FIGS. 3 and 4 describe further embodiments of the present invention. FIG. 3 shows an environment 60 and FIG. 4 shows an environment 70. The calibration signal emitting unit 46 is preferably arranged at a distance from the vehicle 5 and communicates with the calibration unit 42 via the network 9. In FIG. 4, the calibration signal emitting unit 46 is arranged at a distance from the vehicle 5 and communicates with an externally located calibration unit 42, which communicates with the ECU 20 via, for example, the network 9.

Figure 5:
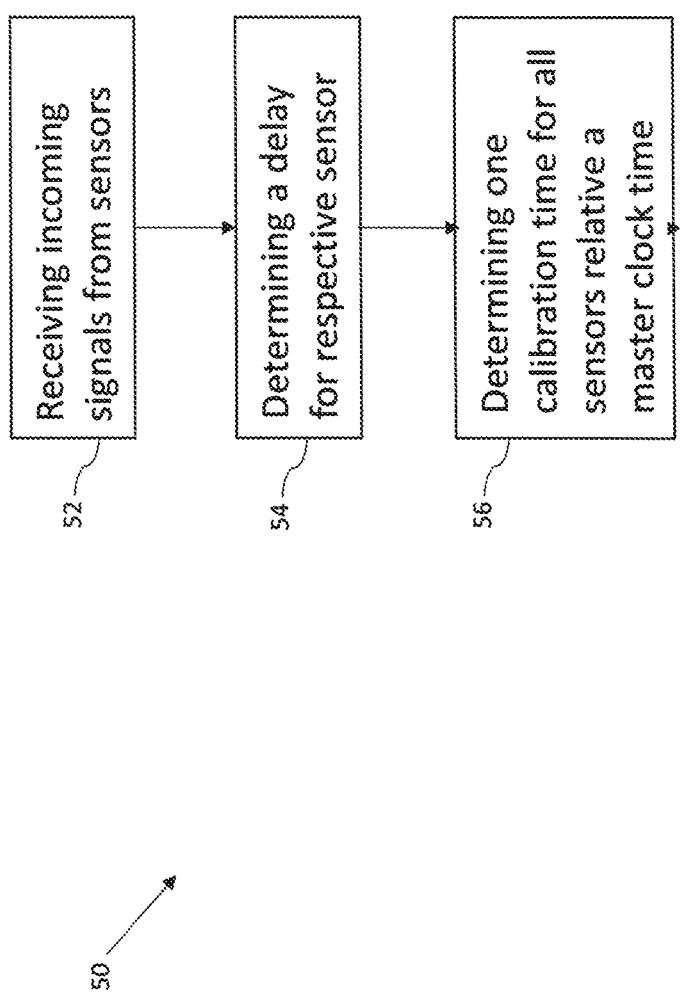
FIG. 5 is a schematic flow diagram showing steps of a method according to the present invention.

With reference to FIG. 5, a method for calibrating sensor signals in networks in a vehicle will be discussed. As described above with reference to FIGS. 1-4, a number of sensors 8 are arranged in the vehicle including one or more cameras 12a, 12b, one or more LIDAR 14a, 14b, and one or more radar units 16a, 16b each communicating with an electronic control unit 20 over a network 30. The electronic control unit 20 communicates with vehicle elements including braking system and steerings system 18. The method comprises receiving, at step 52, incoming signals from sensors 8 at the calibration unit 42, wherein the incoming signals contain information of a detected object or signal, for example, from the calibration signal emitting unit 46. At step 54, a delay for each received signal relative to a predetermined master clock time is determined and at step 56 one calibration time for all the received signals based on the determined delays relative the predetermined master clock time is determined. The system clock time of the electronic control unit 20 or network 30 can for example be selected as master clock time. Alternatively, a sensor clock time can be selected as master clock time. In this case, any one of the sensors can be selected. According to embodiments of the present invention, the determination of one calibration time for all the received signals can based on a weighted average of the different delays, or a median value of the different delays, or a selected time corresponding to the master clock time and a delay being lower than the maximum delay and higher than the minimum delay. Hence, for example, if three delays is detected for sensor X, Y and Z, respectively to be $T_x=T_0+x$, $T_y=T_0+y$, and $T_z=T_0+z$, respectively, where $T_0$ is the master clock time and x is 100 msec (the delay for a first sensor X), y is 150 msec (the delay for the second sensor Y) and z is 200 msec (the delay for the third sensor Z), a suitable calibration time for all sensors can be selected to 150 msec. Thereby, each signal will after calibration instead have a delay of $T'=T_0+150$ msec, that is it is set to be x=y=z=150 msec.

According to embodiments of the present invention, a calibration in space and/or time can be obtained as will be discussed in more detail below.

In one embodiment, a sensor 8 is selected as master origo in a graphical representation of sensor positions, wherein the graphical representation is determined based on received incoming signals from the sensor 8. A suitable sensor 8 to be used as master origo is a LIDAR 14a, 14b, which has a high resolution and very accurate precision. Coordinates for each other sensor 8 is determined in the graphical representation relative the master origo based on incoming signals from the sensors 8. Thereafter, each other sensor coordinates are offset in the graphical representation to obtain a minimum deviation between the master origo and respective sensor coordinates in the graphical representation. Hence, the coordinates of the sensors 8, i.e. the other sensors that are not used as master origo, is moved one by one to as much as possible overlap each other and the master origo to thereby obtain new calibrated positions for the sensors in the graphical representation that has a minimum deviation relative each other and the master origo. Thereby, new and calibrated sensor positions in the graphical representation and/or time can be provided.

Figure 6:
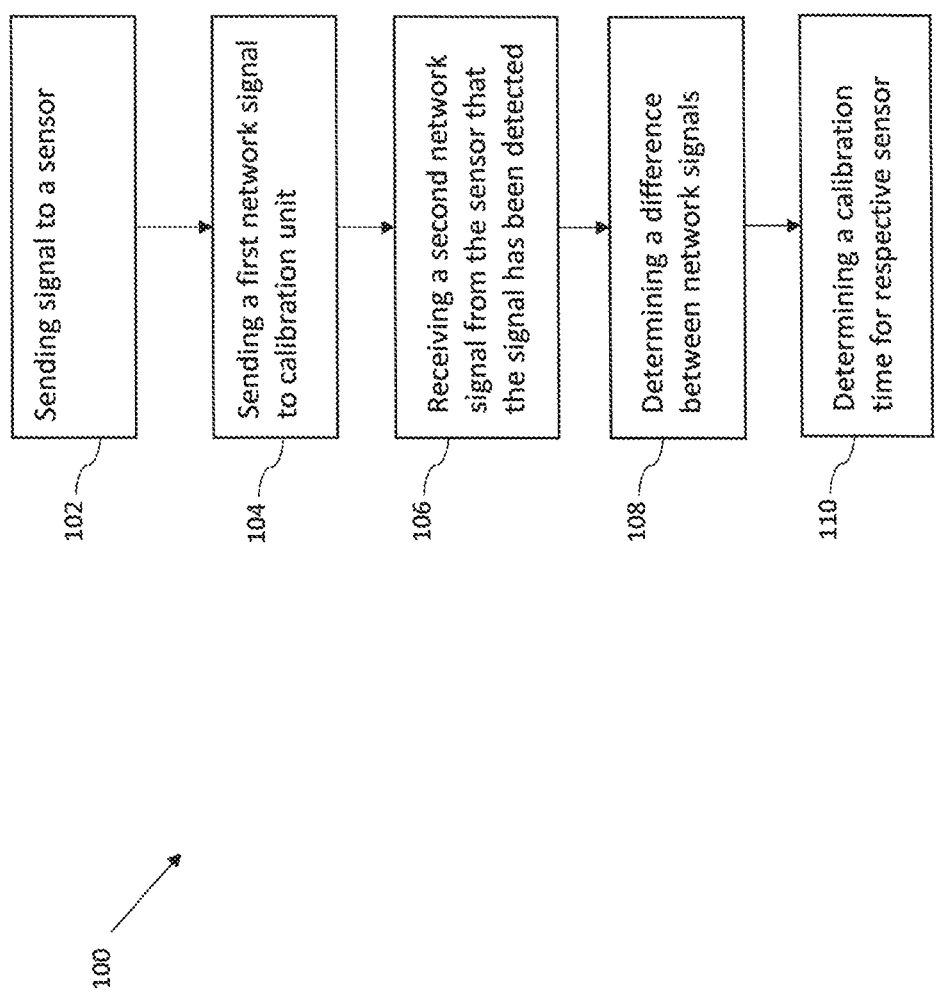
FIG. 6 is a schematic flow diagram showing steps of a method according to the present invention.

In an embodiment of the method as illustrated in FIG. 6, the method 100 includes, at step 102, sending at least one light signal to at least one sensor from the calibration signal emitting unit 46 at a predetermined distance from the sensor 8, at step 104 sending a first network signal to the calibration unit 42 from the calibration signal emitting unit 46 simultaneously or at a predetermined delay, at step 106, receiving a second network signal from the at least one sensor that the light signal has been detected, at step 108, determining the difference between the first and respective second network signals in the calibration unit, and, at step 110, determining a calibration time for the respective sensor based on the determined differences. In embodiments, the predetermined distance can be varied.

Figure 7:
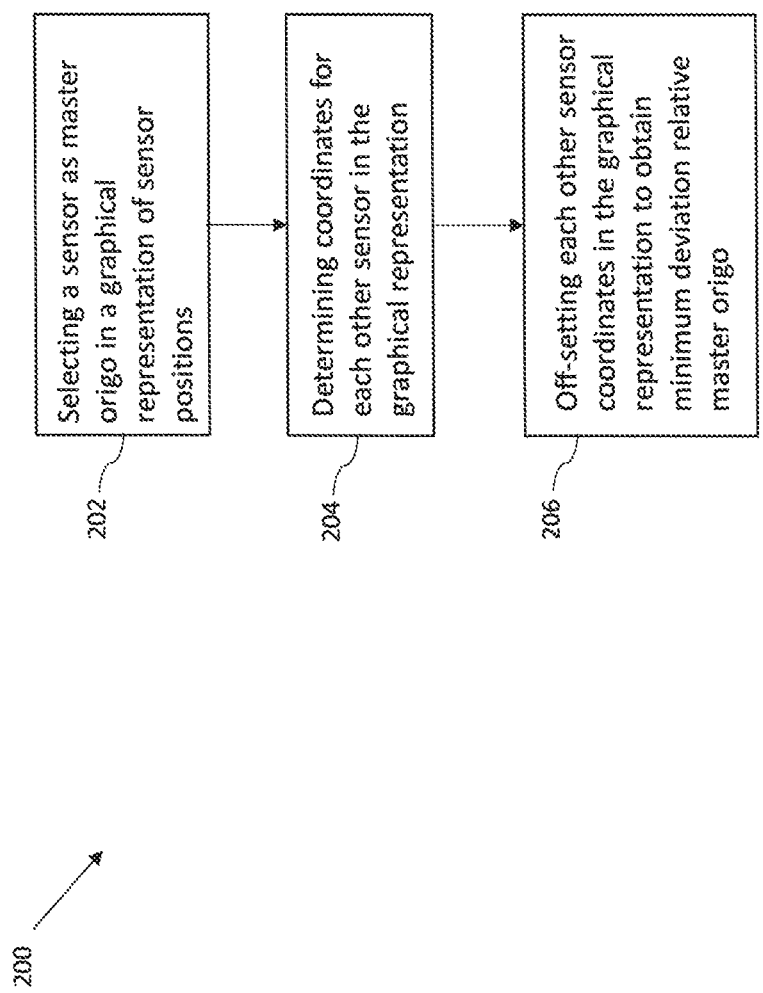
FIG. 7 is a schematic flow diagram showing steps of a method according to the present invention.

In one embodiment, as illustrated in FIG. 7, the method 200 according to the present invention calibrates the sensors 8 in space, i.e. the positions of the sensors 8 in a graphical representation based on received sensors signals, and/or in time. At step 202, the calibration unit 42 selects, or is configured select or to receive instruction to select, a sensor 8 as master origo in a graphical representation of sensor positions, wherein the graphical representation is determined based on received incoming signals from the sensor 8. A suitable sensor 8 to be used as master origo is a LIDAR 14a, 14b, which has a high resolution and very accurate precision. Coordinates for each other sensor 8 is determined at step 204 in the graphical representation relative the master origo based on incoming signals from the sensors 8. Thereafter, at step 206, each other sensor coordinates are offset in the graphical representation to obtain a minimum deviation between the master origo and respective sensor coordinates in the graphical representation. Hence, the coordinates of the sensors 8, i.e. the sensors that are not used as master origo, is moved one by one to as much as possible overlap each other and the master origo to thereby obtain new calibrated positions for the sensors in the graphical representation that has a minimum deviation relative each other and the master origo. Thereby, new and calibrated sensor positions in the graphical representation and/or time can be provided.

The calibration signal emitting unit 46, or the calibration unit 46, is configured to simultaneously send a network signal and a light signal (a calibration signal emitting unit is lit), with a very small delay, for example, 1-5 msec. The unit 46 has a known geometry, for example, 10×10 cm, or 5×5 cm, 20×20 cm, or 5×10 cm, and may also rotate with a know and adjustable frequency.

As mentioned above, the predetermined distance between the unit 46 and a sensor 8 can be varied in order to calibrate the sensors not only in time but also in space.

Preferably, each sensor is calibrated at time in order to obtain as small delays as possible in the system.

Although exemplary embodiments of the present invention have been shown and described, it will be apparent to those having ordinary skill in the art that a number of changes, modifications, or alterations to the inventions as described herein may be made. Thus, it is to be understood that the above description of the invention and the accompanying drawings is to be regarded as a non-limiting example thereof and that the scope of protection is defined by the appended patent claims.

What is claimed is:

1. A method implemented in an electronic control unit for calibrating sensor signals in networks in a vehicle, a number of sensors being arranged in the vehicle including at least one camera, at least one LIDAR, and at least one radar unit each communicating with an electronic control unit over a network, the electronic control unit including processing circuitry configured for communicating with vehicle elements including a braking system and a steering system, the method comprising:
   receiving incoming signals from at least one sensor at the electronic control unit, the incoming signals containing information of one of a detected object and a signal;
   determining a delay for each signal of the received incoming signals relative to a predetermined master clock time;
   determining one calibration time for all the received incoming signals based on the determined delays relative to each other;
   modifying at least one signal of the received incoming signals from sensors based on the determined one calibration time; and
   causing an instruction to be transmitted to at least one of the braking system and the steering system, the instruction being generated based on the at least one modified signal.

2. The method according to claim 1, further including selecting a system clock time of one of the electronic control unit and the network as the predetermined master clock time.

3. The method according to claim 2, further including:
   selecting a sensor as master origin in a graphical representation of sensor positions, wherein the graphical representation is determined based on received incoming signals from the sensors;
   determining coordinates for each other sensor in the graphical representation relative said master origin; and
   off-setting each other sensor coordinates in the graphical representation to obtain a minimum deviation between the master origin and respective sensor coordinates, wherein at least one of calibrated sensor positions and time can be provided.

4. The method according to claim 1, further including selecting a sensor clock time as the predetermined master clock time.

5. The method according to claim 1, further including:
   selecting a sensor as master origin in a graphical representation of sensor positions, wherein the graphical representation is determined based on the received incoming signals from the sensors;
   determining coordinates for each other sensor in the graphical representation relative to the master origin; and
   off-setting each other sensor coordinates in the graphical representation to obtain a minimum deviation between the master origin and respective sensor coordinates, wherein at least one of calibrated sensor positions and time can be provided.

6. The method according to claim 1, wherein determining one calibration time for all the received signals is based on one of:
   a weighted average of the different delays;
   a median value of the different delays; and
   a selected time corresponding to the predetermined master clock time and a delay being lower than the maximum delay and higher than the minimum delay.

7. The method according to claim 1, further including:
   sending at least one light signal to at least one sensor from a calibration signal emitting unit at a predetermined distance from said sensor;
   sending a first network signal to the processing circuitry from the calibration signal emitting unit one of simultaneously and at a predetermined delay;
   receiving a second network signal from the at least one sensor that the light signal has been detected;
   determining the difference between the first and respective second network signals in the processing circuitry; and
   determining a calibration time for the respective sensor based on the determined difference.

8. The method according to claim 7, wherein the predetermined distance can be varied.

9. A system for calibrating sensor signals in networks in a vehicle, a number of sensors being arranged in the vehicle including at least one camera, at least one LIDAR, and at least one radar unit each communicating with an electronic control unit over a network, the electronic control unit communicating with vehicle elements including a braking system and a steering system, the electronic control unit comprising processing circuitry, the processing circuitry being configured to:

receive incoming signals from the number of sensors, the incoming signals containing information of one of a detected object and a signal;

determine a delay for each signal of the received incoming signals relative to a predetermined master clock time;

determine one calibration time for all the received incoming signals based on the determined delays relative to each other;

modify at least one signal of the received incoming signals from sensors based on the determined one calibration time; and cause an instruction to be transmitted to at least one of the braking system and the steering system, the instruction being generated based on the at least one modified signal.

10. The system according to claim 9, wherein the processing circuitry is further configured to select a system clock time of one of the electronic control unit and the network as the predetermined master clock time.

11. The system according to claim 9, wherein a sensor clock time is selected as the predetermined master clock time.

12. The system according to claim 9, wherein the processing circuitry is:

one of configured to select and configured to receive an instruction to select a sensor as master origin in a graphical representation of sensor positions, the graphical representation being determined based on received incoming signals from the number of sensors;

determine coordinates for each other sensor in the graphical representation relative to the master origin; and off-set each other sensor coordinates in the graphical representation to obtain a minimum deviation between the master origin and respective sensor coordinates, wherein at least one of calibrated sensor positions and time can be provided.

13. The system according to claim 9, wherein determining one calibration time for all the received signals is based on one of:

a weighted average of the different delays;

a median value of the different delays; and a selected time corresponding to the predetermined master clock time and a delay being lower than the maximum delay and higher than the minimum delay.

\* \* \* \* \*